UNITED STATES PATENT OFFICE.

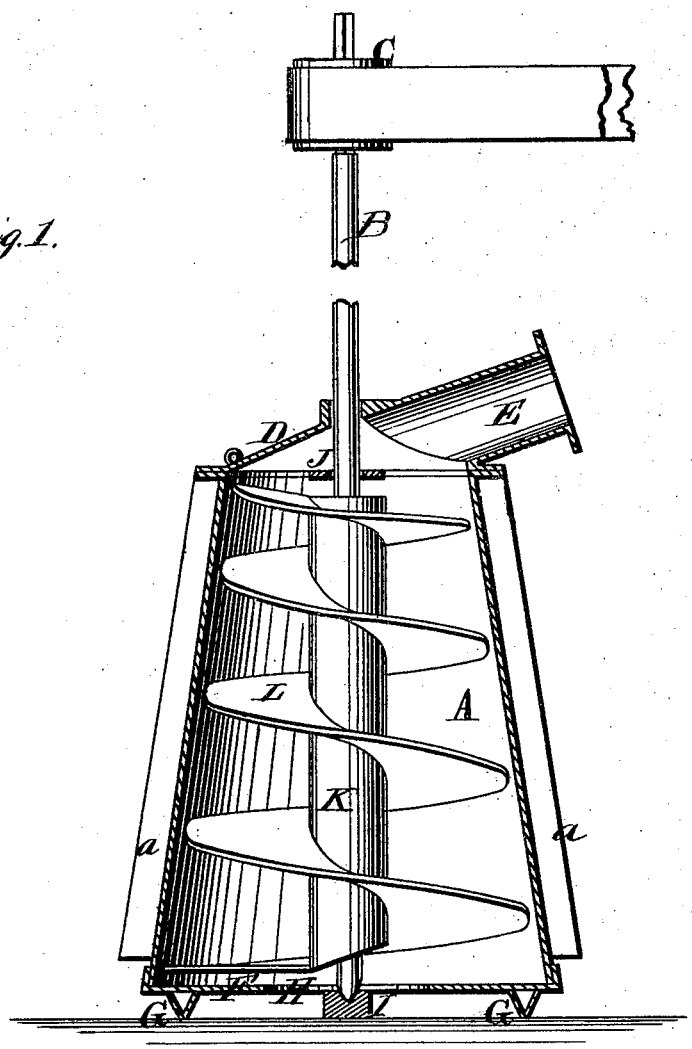

JULIUS LANGE, OF INDEPENDENCE, LOUISIANA.

IMPROVEMENT IN ROTARY PUMPS.

Specification forming part of Letters Patent No. 185,335, dated December 12, 1876; application filed October 21, 1876.

*To all whom it may concern:*

Be it known that I, JULIUS LANGE, of Independence, in the parish of Tangipahoa and State of Louisiana, have invented a new and valuable Improvement in Rotary Pumps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central sectional view of my rotary pump.

This invention relates to rotary pumps; and it consists, mainly, in the combination of a casing shaped like a frustum of a cone, with an inclosed rotating shaft carrying a spiral water-lifting blade.

In the annexed drawings, A designates the casing of my pump, and B the rotating shaft, which is provided at its upper end with a pulley, C, that receives motion through an endless belt from any suitable motor. A crank or cog-gearing may be substituted for said pulley, belt, &c. Said casing A is shaped like a frustum of a cone, and provided with longitudinal flanges $a\ a$, which serve to retain it in proper position for operation. The upper end of said casing is closed by a cap or top piece, D, which is perforated to allow the passage of shaft B, and is provided with discharge-tube E. The bottom of said casing A is provided with a base-plate, F, which stands on feet or supporting-lugs G G, and has a large central opening, H. A bridge-bar, I, extends across said opening, and serves a double purpose. It constitutes an additional support for said casing, and also the lower bearing of shaft B. Said shaft has its upper bearing in a similar metal bridge, J, which extends across the top of casing A. Said shaft B is provided inside of said casing with a surrounding cylinder, K, which is fixed to and moves with said shaft. On said cylinder is firmly secured a spiral blade, L, which tapers upward like the inclosing-casing A.

The operation of the above-described apparatus is as follows: Casing A being set in the water, and shaft B being rotated as described, the water is drawn in through bottom opening H by the rotation of spiral blade L. Said blade lifts the said water with a continually-increasing pressure, due to the upward tapering of casing A, and at last forces it out with violence through discharge-tube E.

My invention mainly lies in the tapering construction of my casing and elevating screw-blade, whereby the device is converted into a force-pump operating with cumulative power.

Two screw-blades may be used instead of one, if desired. Cylinder K may be dispensed with, as may also the greater part of shaft B within said casing. Various other modifications may be made without departing from the spirit and scope of my invention; but I prefer the devices named when constructed and arranged as hereinbefore described.

This pump will operate in any position, but best when arranged vertically. Its operation is assisted by setting it deeply in the water, provided it is not entirely submerged.

What I claim as new, and desire to secure by Letters Patent, is—

1. In a pump, the conical casing A, provided with flanges $a\ a$ and discharge-outlet E, substantially as described, and for the purpose set forth.

2. The conical casing A, which is adapted to be set in a perpendicular position, having the frustum of said conical casing up, and provided on its base with lugs G G and transverse bearing I, in combination with the rotating shaft K, carrying a spiral water-lifting blade, substantially as described, and for the purpose set forth.

In testimony that I claim the above I have hereunto subscribed my name in the presence of two witnesses.

JULIUS LANGE.

Witnesses:
G. T. RAOUL,
C. I. BRADLEY.